United States Patent
Otsuki et al.

(10) Patent No.: US 7,524,439 B2
(45) Date of Patent: Apr. 28, 2009

(54) POSITIVE ELECTRODE FOR NON-AQUEOUS ELECTROLYTE BATTERY AND METHOD OF PRODUCING THE SAME AS WELL AS NON-AQUEOUS ELECTROLYTE BATTERY

(75) Inventors: Masashi Otsuki, Musashimurayama (JP); Shinichi Eguchi, Kawasaki (JP); Hiroshi Kanno, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/046,164

(22) Filed: Mar. 11, 2008

(65) Prior Publication Data

US 2008/0164444 A1 Jul. 10, 2008

Related U.S. Application Data

(62) Division of application No. 10/505,422, filed as application No. PCT/JP03/01737 on Feb. 18, 2003, now abandoned.

(30) Foreign Application Priority Data

| Feb. 25, 2002 | (JP) | 2002-047991 |
| Feb. 25, 2002 | (JP) | 2002-048122 |
| Apr. 10, 2002 | (JP) | 2002-108024 |

(51) Int. Cl.
*H01B 1/08* (2006.01)
*H01M 4/04* (2006.01)

(52) U.S. Cl. .............. 252/520.21; 252/500; 252/518.1; 252/519.12; 252/519.15; 252/519.2; 252/519.21; 252/519.3; 252/520.2; 252/519.1; 429/223; 429/224; 429/231.95; 429/231.5; 429/220; 429/221; 429/229; 429/231

(58) Field of Classification Search .............. 252/500, 252/518.1, 519.1, 519.12, 519.15, 519.2, 252/519.21, 519.3, 520.2, 520.21; 429/223, 429/224, 231.95, 231.5, 220, 221, 229, 231
See application file for complete search history.

(56) References Cited

U.S. PATENT DOCUMENTS

| 5,824,434 | A | * | 10/1998 | Kawakami et al. | 429/209 |
| 6,136,287 | A | * | 10/2000 | Horne et al. | 423/599 |
| 6,316,140 | B1 | * | 11/2001 | Hatazawa et al. | 429/163 |
| 6,749,648 | B1 | * | 6/2004 | Kumar et al. | 29/623.1 |
| 7,384,680 | B2 | * | 6/2008 | Bi et al. | 428/143 |
| 2002/0114995 | A1 | * | 8/2002 | Thackeray et al. | 429/224 |
| 2002/0136954 | A1 | * | 9/2002 | Thackeray et al. | 429/231.1 |
| 2003/0108801 | A1 | * | 6/2003 | Otsuki et al. | 429/339 |
| 2005/0106458 | A1 | * | 5/2005 | Eguchi et al. | 429/212 |
| 2005/0153207 | A1 | * | 7/2005 | Otsuki et al. | 429/232 |

FOREIGN PATENT DOCUMENTS

| JP | 54-103515 A | 8/1979 |
| JP | 62-278125 A | 12/1987 |
| JP | 63-121250 A | 5/1988 |
| JP | 63-138656 A | 6/1988 |
| JP | 2001-283861 A | 10/2001 |

OTHER PUBLICATIONS

Derwent (TM) acc. No. 2002-098271 (Jul. 2008).*

* cited by examiner

*Primary Examiner*—Douglas McGinty
(74) *Attorney, Agent, or Firm*—Sughrue Mion, PLLC

(57) ABSTRACT

In a positive electrode of a non-aqueous electrolyte battery, at least one metal oxide selected from the group consisting of titanium dioxide, alumina, zinc oxide, chromium oxide, lithium oxide, nickel oxide, copper oxide and iron oxide is dispersed between particles of an active substance for the positive electrode, whereby a discharge capacity or a discharge-recharge capacity of the non-aqueous electrolyte battery is improved.

3 Claims, 2 Drawing Sheets

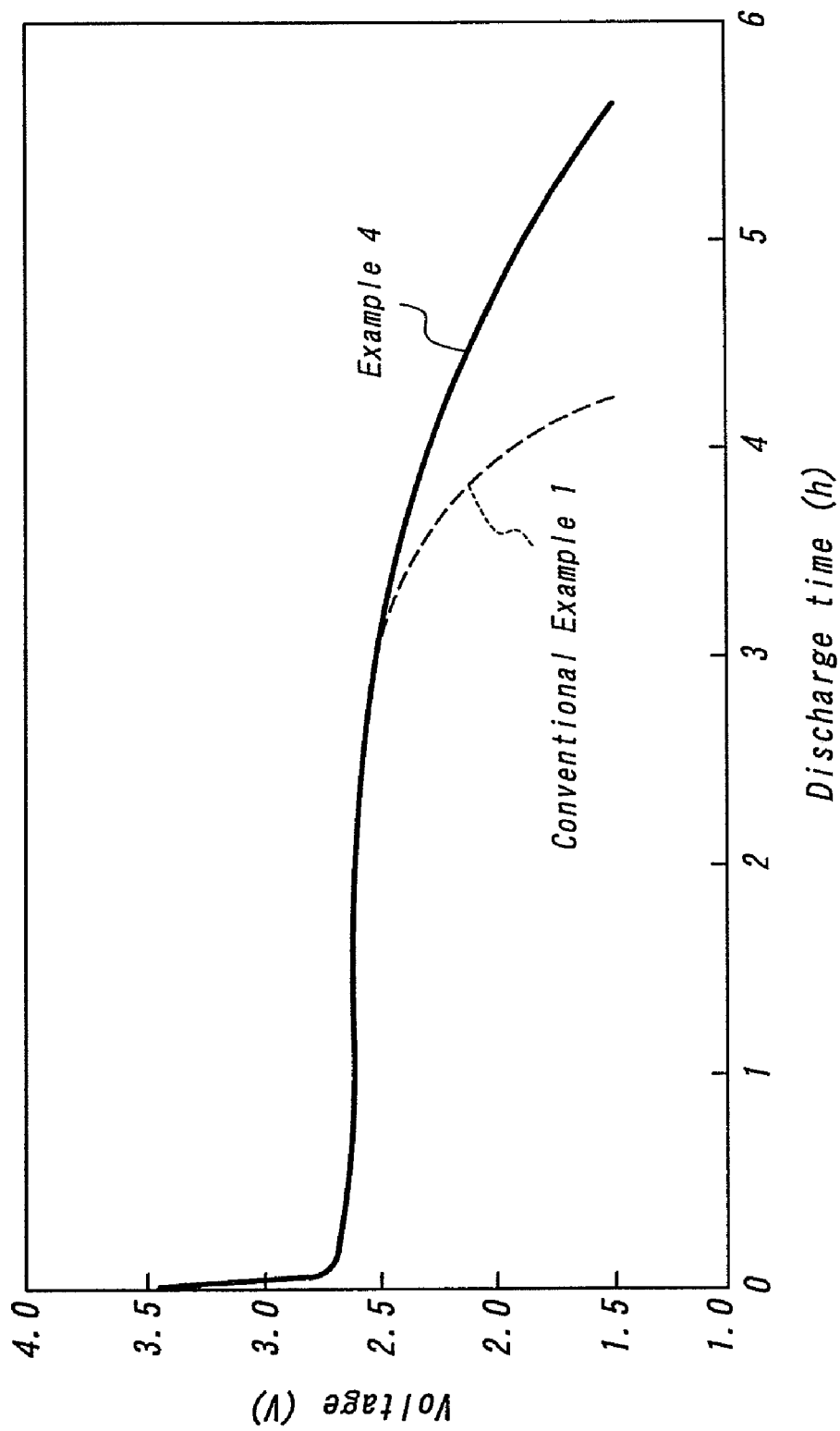

POSITIVE ELECTRODE FOR NON-AQUEOUS ELECTROLYTE BATTERY AND METHOD OF PRODUCING THE SAME AS WELL AS NON-AQUEOUS ELECTROLYTE BATTERY

This is a divisional of application Ser. No. 10/505,422 filed Aug. 24, 2004, which is a 371 of PCT/JP03/01737 filed Feb. 18, 2003, which claims priority from Japanese Patent Application Nos. 2002-47991, 2002-48122 and 2002-108024, filed Feb. 25, 2002, Feb. 25, 2002 and Apr. 10, 2002, respectively. The entire disclosures of the prior applications are hereby incorporated by reference.

TECHNICAL FIELD

This invention relates to a positive electrode for a non-aqueous electrolyte battery and a method of producing the same as well as a non-aqueous electrolyte battery provided with such a positive electrode, and more particularly to a positive electrode for non-aqueous electrolyte primary battery and non-aqueous electrolyte secondary battery and a method of producing the same as well as non-aqueous electrolyte primary battery and non-aqueous electrolyte secondary battery provided with such a positive electrode.

BACKGROUND ART

Recently, batteries having a small size, a light weight, a long life and a high energy density are particularly demanded as a power source for small-size electronic equipments with the rapid advance of electronics. In this connection, non-aqueous electrolyte primary batteries such as lithium primary battery using manganese dioxide as a positive electrode and lithium as a negative electrode and the like are known as a battery having a high energy density because an electrode potential of lithium is lowest among metals and an electric capacity per unit volume is large, and there are actively studies many kinds thereof. On the other hand, there are developed run-flat tires capable of continuously running over a significant distance up to a repair-makeup place even if a pneumatic tire is punctured or the like. As a result, it is proposed to provide the run-flat tire with an internal pressure alarm device of sending an abnormality transmitting signal when the internal pressure of the tire measured is rendered into an internal pressure lower than the given value. As a power source for the internal pressure alarm device is used the above non-aqueous electrolyte primary battery having a small size, a light weight, a long life and a high energy density and using manganese dioxide as a positive electrode and lithium as a negative electrode.

In the above non-aqueous electrolyte primary battery, lithium is frequently used as a material forming the negative electrode. Since lithium violently reacts with a compound having an active proton such as water, alcohol or the like, an electrolyte to be used is limited to a non-aqueous solution or a solid electrolyte. The solid electrolyte is limited to only a use under a low discharge current because an ionic conductivity is low. Therefore, the electrolyte usually used is an aprotic organic solvent such as an ester-based organic solvent or the like at the present time.

On the other hand, a nickel-cadmium battery has been prevailingly used as a secondary battery for memory back-up of AV-information equipments such as personal computer, VTR and the like or a driving power source therefor. Recently, non-aqueous electrolyte batteries (metallic lithium secondary battery, lithium ion secondary battery and the like) are particularly noted as an alternative for the nickel-cadmium battery because they have a high voltage and a high energy density and indicate an excellent self-discharge characteristic, and there are attempted various developments and a part of products is commercialized. For example, more than half of note-type personal computers, mobile phones are driven by the non-aqueous electrolyte secondary battery.

In these non-aqueous electrolyte secondary batteries, a lithium-containing composite oxide is used as a material forming the positive electrode, and carbon is frequently used as a material forming the negative electrode, while various organic solvents are used as an electrolyte for the purpose of reducing a risk when lithium is produced on the surface of the negative electrode and making a driving voltage high. Also, in the non-aqueous electrolyte secondary battery for a camera, an alkali metal (particularly lithium metal or lithium alloy) is used as a negative electrode material, so that an aprotic organic solvent such as ester-based organic solvent or the like is usually used as an electrolyte.

DISCLOSURE OF THE INVENTION

As previously mentioned, the non-aqueous electrolyte primary battery is small in the size, light in the weight, long in the life and high in the energy density. It is demanded to highly function the internal pressure alarm device so as to transmit various information of the tire in addition to the tire internal pressure and a power consumption quantity increases accompanied therewith, so that if the existing non-aqueous electrolyte primary battery is used as a power source for such an internal pressure alarm device, there are caused problems that the life becomes short and the exchange is required in a short period.

Also, the lithium metal or lithium alloy as the negative electrode material in the non-aqueous electrolyte primary battery is very high in the activity to water content, so that there is a problem that if the sealing of the battery is incomplete and water is penetrated thereinto or the like, the negative electrode material reacts with water to generate hydrogen or cause ignition or the like and the risk becomes higher. Furthermore, since the lithium metal is low in the melting point (about 170° C.), there is a problem that if a large current violently flows in the short-circuiting or the like, there is caused a very risky state that the battery abnormally generates heat to fuse the battery or the like. In addition, there is a problem that the organic solvent based electrolyte is vaporized or decomposed accompanied with the aforementioned heat generation of the battery to generate a gas or cause explosion-ignition of the battery through the generated gas. Even in the non-aqueous electrolyte primary battery not naturally assuming the recharging, there may be caused the recharging through erroneous operation, and in this case there is a problem of causing ignition.

On the other hand, the existing non-aqueous electrolyte secondary battery is high in the energy density as compared with the nickel-cadmium battery as mentioned above, so that it has a high discharge-recharge capacity. However, in order to further mitigate a burden of a user for conducting the recharging, it is required to more improve the discharge-recharge capacity.

Also, when the alkali metal (particularly lithium metal or lithium alloy) is used as a negative electrode material in the non-aqueous electrolyte secondary battery, the alkali metal is very high in the activity to water content, so that there is a problem that if the sealing of the battery is incomplete and water is penetrated thereinto or the like, the negative electrode material reacts with water to generate hydrogen or cause ignition or the like and the risk becomes higher. Furthermore, since the lithium metal is low in the melting point (about 170° C.), there is a problem that if a large current violently flows in the short-circuiting or the like, there is caused a very risky state that the battery abnormally generates heat to fuse the battery or the like. In addition, there is a problem that the organic solvent based electrolyte is vaporized or decomposed accompanied with the aforementioned heat generation of the battery to generate a gas or cause explosion-ignition of the battery through the generated gas.

It is, therefore, an object of the invention to provide a non-aqueous electrolyte primary battery having high discharge capacity and energy density, a high power output and a long life. It is another object of the invention to provide a non-aqueous electrolyte primary battery having a high safety in addition to the high discharge capacity and energy density.

It is the other object of the invention to provide a non-aqueous electrolyte secondary battery having a high discharge-recharge capacity. Also, it is a further object of the invention to provide a non-aqueous electrolyte secondary battery having a high safety in addition to the high discharge-recharge capacity.

The inventors have made various studies in order to achieve the above objects and found that a lithium primary battery having high discharge capacity and energy density and high power output and a long life is obtained by improving a positive electrode in a non-aqueous electrolyte primary battery using manganese dioxide as an active substance for the positive electrode, and further a non-aqueous electrolyte primary battery having higher discharge capacity and energy density and a high safety is obtained by adding a phosphazene derivative and/or an isomer of the phosphazene derivative to an electrolyte.

Also, the inventors have found that a non-aqueous electrolyte secondary battery having a high discharge-recharge capacity is obtained by improving a positive electrode in a non-aqueous electrolyte secondary battery using a lithium-containing composite oxide as an active substance for the positive electrode, and further a non-aqueous electrolyte secondary battery having higher discharge-recharge capacity and a high safety is obtained by adding a phosphazene derivative and/or an isomer of the phosphazene derivative to an electrolyte.

That is, the invention is as follows.

1. A positive electrode for a non-aqueous electrolyte primary battery, characterized in that at least one metal oxide selected from the group consisting of titanium oxide, alumina, zinc oxide, chromium oxide, lithium oxide, nickel oxide, copper oxide and iron oxide is dispersed between particles of manganese dioxide.
2. A positive electrode for a non-aqueous electrolyte primary battery according to the item 1, wherein the metal oxide is titanium dioxide.
3. A positive electrode for a non-aqueous electrolyte primary battery according to the item 1 or 2, wherein a mass of the metal oxide is 0.5% to 4% of a mass of manganese dioxide.
4. A method of producing a positive electrode for a non-aqueous electrolyte primary battery which comprises the steps of:
   (I) a step of producing a mixed solution by adding manganese dioxide and an alkoxide of at least one metal selected from the group consisting of titanium, aluminum, zinc, chromium, lithium, nickel, copper and iron to an organic solvent and mixing them;
   (II) a step of adding water to the mixed solution to produce a metal hydroxide;
   (III) a step of changing the resulting metal hydroxide into a metal oxide by heating and drying a solution containing the metal hydroxide and dispersing the metal oxide between particles of manganese dioxide to produce powder for a positive electrode; and
   (IV) a step of shaping the powder for a positive electrode to produce a positive electrode.
5. A method of producing a positive electrode for a non-aqueous electrolyte primary battery according to the item 4, wherein the metal is titanium.
6. A method of producing a positive electrode for a non-aqueous electrolyte primary battery according to the item 4, wherein the alkoxide of the metal is titanium isopropoxide ($Ti[OCH(CH_3)_2]_4$).
7. A non-aqueous electrolyte primary battery comprising a positive electrode as described in any one of the items 1 to 3, a negative electrode, and an electrolyte comprising an aprotic organic solvent and a support salt.
8. A non-aqueous electrolyte primary battery according to the item 7, wherein the aprotic organic solvent is added with a phosphazene derivative and/or an isomer of the phosphazene derivative.
9. A non-aqueous electrolyte primary battery according to the item 8, wherein the phosphazene derivative has a viscosity at 25° C. of not more than 300 mPa·s (300 cP) and is represented by the following formula (I) or (II):

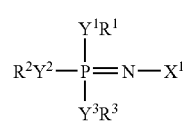

(I)

(wherein $R^1$, $R^2$ and $R^3$ are independently a monovalent substituent or a halogen element; $X^1$ is an organic group containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond)

$$(NPR^4_2)_n \qquad (II)$$

(wherein $R^4$ is independently a monovalent substituent or a halogen element; and n is 3 to 15).

10. A non-aqueous electrolyte primary battery according to the item 9, wherein the phosphazene derivative of the formula (II) is represented by the following formula (III):

$$(NPF_2)_n \qquad (III)$$

(wherein n is 3 to 13).

11. A non-aqueous electrolyte primary battery according to the item 9, wherein the phosphazene derivative of the formula (II) is represented by the following formula (IV):

$$(NPR^5_2)_n \qquad (IV)$$

(wherein $R^5$ is independently a monovalent substituent or fluorine and at least one of $R^5$s is a fluorine-containing monovalent substituent or fluorine, and n is 3 to 8, provided that all of $R^5$s are not fluorine).

12. A non-aqueous electrolyte primary battery according to the item 8, wherein the phosphazene derivative is solid at 25° C. and is represented by the following formula (V):

$$(NPR^6_2)_n \qquad (V)$$

(wherein $R^6$ is independently a monovalent substituent or a halogen element; and n is 3 to 6).

13. A non-aqueous electrolyte primary battery according to the item 8, wherein the isomer is represented by the following formula (VI) and is an isomer of a phosphazene derivative represented by the following formula (VII):

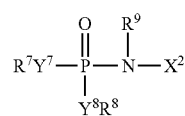

(VI)

-continued

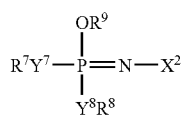
(VII)

(in the formulae (VI) and (VII), $R^7$, $R^8$ and $R^9$ are independently a monovalent substituent or a halogen element; $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^7$ and $Y^8$ are independently a bivalent connecting group, a bivalent element or a single bond).

14. A positive electrode for a non-aqueous electrolyte secondary battery, characterized in that at least one metal oxide selected from the group consisting of titanium oxide, alumina, zinc oxide, chromium oxide, lithium oxide, nickel oxide, copper oxide and iron oxide is dispersed between particles of at least one lithium-containing composite oxide selected from the group consisting of $LiCoO_2$, $LiNiO_2$ and $LiMn_2O_4$.

15. A positive electrode for a non-aqueous electrolyte secondary battery according to the item 14, wherein the metal oxide is titanium oxide.

16. A positive electrode for a non-aqueous electrolyte secondary battery according to the item 14 or 15, wherein a mass of the metal oxide is 0.5% to 4% of a mass of the lithium-containing composite oxide.

17. A method of producing a positive electrode for a non-aqueous electrolyte secondary battery, which comprises the steps of:
    (I) a step of producing a mixed solution by adding at least one lithium-containing composite oxide selected from the group consisting of $LiCoO_2$, $LiNiO_2$ and $LiMn_2O_4$ and an alkoxide of at least one metal selected from the group consisting of titanium, aluminum, zinc, chromium, lithium, nickel, copper and iron to an organic solvent and mixing them;
    (II) a step of adding water to the mixed solution to produce a metal hydroxide;
    (III) a step of changing the resulting metal hydroxide into a metal oxide by heating and drying a solution containing the metal hydroxide and dispersing the metal oxide between particles of manganese dioxide to produce powder for a positive electrode; and
    (IV) a step of shaping the powder for a positive electrode to produce a positive electrode.

18. A method of producing a positive electrode for a non-aqueous electrolyte secondary battery according to the item 17, wherein the metal is titanium.

19. A method of producing a positive electrode for a non-aqueous electrolyte secondary battery according to the item 17, wherein the alkoxide of the metal is titanium isopropoxide ($Ti[OCH(CH_3)_2]_4$).

20. A non-aqueous electrolyte secondary battery comprising a positive electrode as described in any one of the items 14 to 16, a negative electrode, and an electrolyte comprising an aprotic organic solvent and a support salt.

21. A non-aqueous electrolyte secondary battery according to the item 20, wherein the aprotic organic solvent is added with a phosphazene derivative and/or an isomer of the phosphazene derivative.

22. A non-aqueous electrolyte secondary battery according to the item 21, wherein the phosphazene derivative has a viscosity at 25° C. of not more than 300 mPa·s (300 cP) and is represented by the following formula (I) or (II):

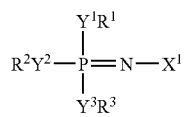
(I)

(wherein $R^1$, $R^2$ and $R^3$ are independently a monovalent substituent or a halogen element; $X^1$ is an organic group containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond)

$(NPR^4{}_2)_n$ (II)

(wherein $R^4$ is independently a monovalent substituent or a halogen element; and n is 3 to 15).

23. A non-aqueous electrolyte secondary battery according to the item 22, wherein the phosphazene derivative of the formula (II) is represented by the following formula (III):

$(NPF_2)_n$ (III)

(wherein n is 3 to 13).

24. A non-aqueous electrolyte secondary battery according to the item 22, wherein the phosphazene derivative of the formula (II) is represented by the following formula (IV):

$(NPR^5{}_2)_n$ (IV)

(wherein $R^5$ is independently a monovalent substituent or fluorine and at least one of $R^5$s is a fluorine-containing monovalent substituent or fluorine, and n is 3 to 8, provided that all of $R^5$s are not fluorine).

25. A non-aqueous electrolyte secondary battery according to the item 21, wherein the phosphazene derivative is solid at 25° C. and is represented by the following formula (V):

$(NPR^6{}_2)_n$ (V)

(wherein $R^6$ is independently a monovalent substituent or a halogen element; and n is 3 to 6).

26. A non-aqueous electrolyte secondary battery according to the item 21, wherein the isomer is represented by the following formula (VI) and is an isomer of a phosphazene derivative represented by the following formula (VII):

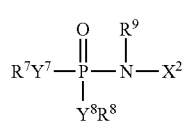
(VI)

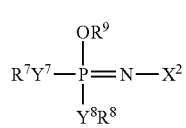
(VII)

(in the formulae (VI) and (VII), $R^7$, $R^8$ and $R^9$ are independently a monovalent substituent or a halogen element; $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^7$ and $Y^8$ are independently a bivalent connecting group, a bivalent element or a single bond).

BRIEF DESCRIPTION OF THE DRAWINGS

FIG. 2 is a discharge curve at room temperature of each of a general-purpose lithium primary battery (Conventional Example 1) and a lithium primary battery provided with a positive electrode using powder obtained by dispersing particles of titanium oxide between particles of manganese dioxide and an electrolyte added with a phosphazene derivative according to the invention (Example 4).

BEST MODE FOR CARRYING OUT THE INVENTION

Figure 1:
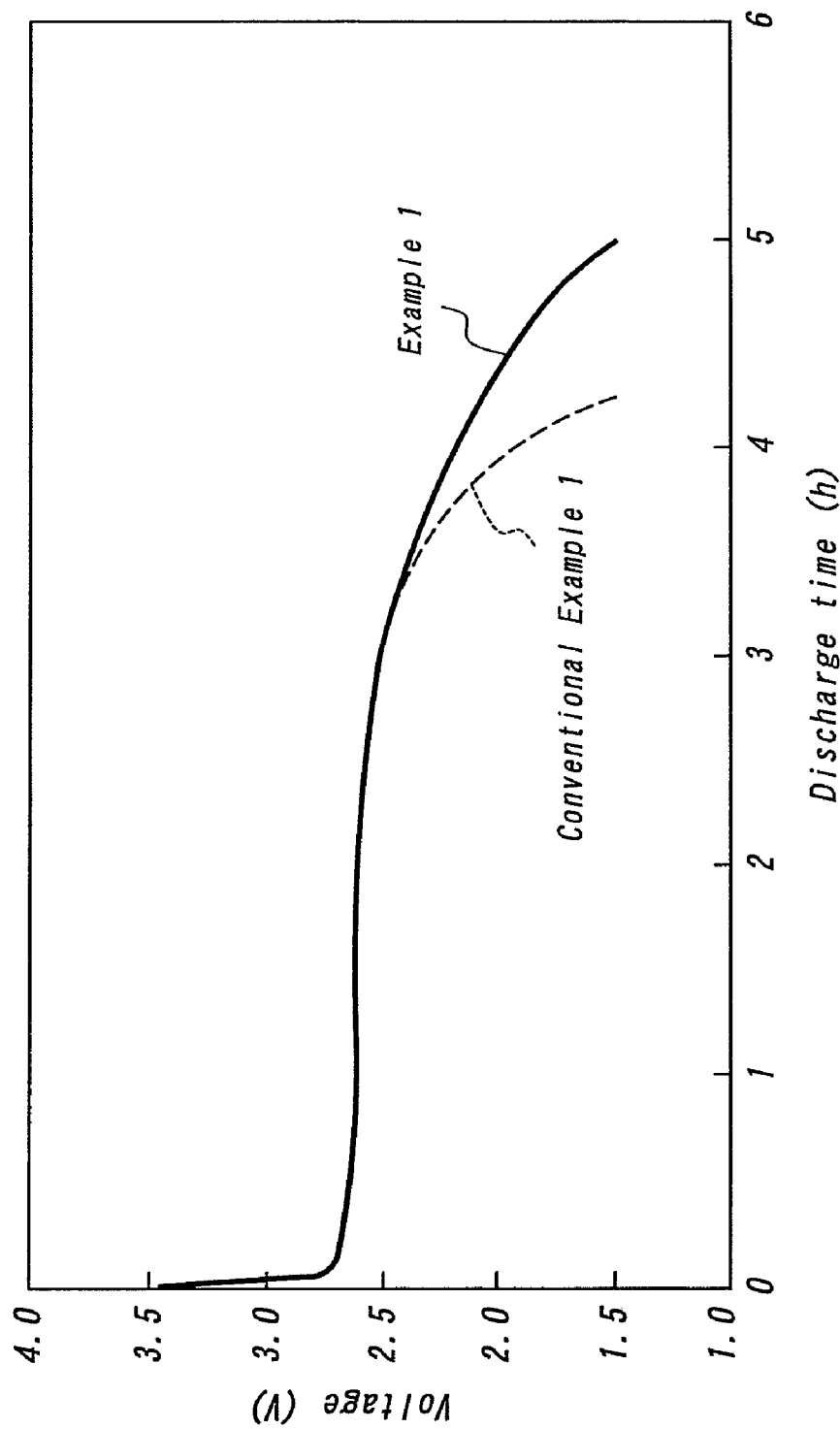
FIG. 1 is a discharge curve at room temperature of each of a general-purpose lithium primary battery (Conventional Example 1) and a lithium primary battery provided with a positive electrode using powder obtained by dispersing particles of titanium oxide between particles of manganese dioxide according to the invention (Example 1).

The invention will be described in detail below.

<Positive Electrode for Non-Aqueous Electrolyte Primary Battery>

The positive electrode for the non-aqueous electrolyte primary battery according to the invention comprises manganese dioxide and a metal oxide dispersed between particles of manganese dioxide, and may contain an additive usually used in the technical field of the non-aqueous electrolyte primary battery such as an electrically conductive member, a binding agent or the like, if necessary.

Manganese dioxide used in the invention may be produced by an electrochemical synthesis or by a chemical synthesis. Among materials usually used as an active substance for the positive electrode in the non-aqueous electrolyte primary battery, manganese dioxide is high in the discharge potential and high in the capacity and excellent in the safety and the wettability to the electrolyte and further excellent in the cost. The particle size of manganese dioxide is 1-60 μm, preferably 20-40 μm. When the particle size is less than 1 μm or more than 60 μm, the packing is deteriorated in the shaping of the positive electrode laminated member (comprising manganese dioxide, electrically conductive member and binding agent) or the amount of the active substance for the positive electrode included in a unit volume becomes less, and hence the discharge capacity may be undesirably decreased.

As the metal oxide used in the invention, mention may be made of titanium oxide, alumina, zinc oxide, chromium oxide, lithium oxide, nickel oxide, copper oxide and iron oxide. They may be used alone or in a combination of two or more. The metal oxide is preferable to be very fine particles, and the particle size thereof is 10 nm to 1 μm, preferably 20 nm to 60 nm. When the particle size is less than 10 nm, it is difficult to industrially synthesize the particles, while when it exceeds 1 μm, the amount of manganese dioxide included as an active substance for the positive electrode per unit volume is decreased and the energy quantity per unit volume is unfavorably reduced.

In the invention, the metal oxide is dispersed between the particles of manganese dioxide, so that gaps are produced among the particles of manganese dioxide. Since the electrolyte can efficiently penetrate into these gaps, the contact area between the electrolyte and manganese dioxide increases, and hence the capacity factor of manganese dioxide rises and the discharge capacity and energy density are improved.

Among the metal oxides forming the gap in the particles of manganese dioxide, titanium oxide is particularly preferable because titanium oxide does not obstruct the cell electrode reaction in the non-aqueous electrolyte primary battery, and contributes to the stability of the battery by effectively absorbing water but also does not considerably decrease the electric conductivity by the addition (does not raise the internal resistance) and the like.

The mass of the metal oxide in the positive electrode of the invention is preferable to be 0.5% to 4% per the mass of manganese dioxide. When the mass of the metal oxide is less than 0.5% per the mass of manganese dioxide, the effect of dispersing the metal oxide in the particles of manganese dioxide to form the gaps is insufficient, while when it exceeds 4%, the amount of manganese dioxide per unit volume decreases, and at the same time, the surfaces of the particles of manganese dioxide are covered with the metal oxide to unfavorably decrease the contact are between the electrolyte and manganese dioxide.

Among the additives added, if necessary, to the positive electrode of the non-aqueous electrolyte primary battery according to the invention, the electrically conductive member includes acetylene black and the like, and the binding agent includes polyvinylidene fluoride (PVDF), polytetrafluoroethylene (PTFE) and the like. When using these additives, they may be compounded in the same compounding ratio as in the conventional one, for example, powder for positive electrode:electrically conductive member:binding agent=8:1:1–8:1:0.2 (mass ratio).

The form of the positive electrode is not particularly limited and can be properly selected from well-known forms as the electrode. For example, there are mentioned sheet, column, plate, spiral form and the like.

<Production Method of Positive Electrode for Non-Aqueous Electrolyte Primary Battery>

Since it is preferable to disperse very fine particles of the metal oxide between the particles of manganese dioxide in the positive electrode for the non-aqueous electrolyte primary battery of the invention, the metal oxide is preferably prepared by a sol-gel method. Moreover, the preparation method is not particularly limited unless very fine particles can be prepared.

In the production method of the positive electrode for the non-aqueous electrolyte primary battery of the invention, a mixed solution is prepared by adding and mixing manganese dioxide and an alkoxide of at least one metal selected from the group consisting of titanium, aluminum, zinc, chromium, lithium, nickel, copper and iron in an organic solvent as a first step. As the organic solvent, a low boiling point alcohol such as methanol, ethanol or the like and a low boiling point ketone such as acetone or the like are preferable, and particularly ethanol is preferable. As an alkoxy group in the metal alkoxide, isopropoxy group, n-propoxy group and the like are preferable from a viewpoint of the solubility of the metal alkoxide to the organic solvent.

In a second step, water is added to the mixed solution prepared in the first step to produce a metal hydroxide corresponding to the metal alkoxide by a hydrolysis reaction of the metal alkoxide. Moreover, it is preferable to conduct the second step with ice cooling.

In a third step, the solution containing the metal hydroxide is heated and dried to change the metal hydroxide into a metal oxide while removing the solvent, whereby powder for a positive electrode obtained by dispersing the metal oxide between the particles of manganese dioxide is produced. Moreover, in order to completely conduct the removal of the solvent and the dehydration, it is preferable to conduct the heating and drying at a temperature of 120-300° C. for a sufficient time.

In a fourth step, the powder for the positive electrode obtained at the third step is shaped into a given form to obtain a positive electrode for a lithium primary battery. The shaping method is not particularly limited unless the positive electrode having a strength to an extent of causing no breakage in the production course of the non-aqueous electrolyte primary battery can be shaped, and hence the conventionally known methods can be used. For example, it can be carried out by punching out the powder for the positive electrode in a punching machine with a mold corresponding to the form of the positive electrode of the non-aqueous electrolyte primary battery to be aimed. Moreover, the above additives such as electrically conductive member, binding agent and the like are mixed and milled with the powder for the positive electrode before the shaping to form a paste, which mat be dried in hot air (100-120° C.) and punched out in the punching machine.

The positive electrode obtained by the above method is a positive electrode of a non-aqueous electrolyte primary battery in which very fine particles of the metal oxide are dispersed between the particles of manganese dioxide without largely decreasing the amount of the active substance for the positive electrode per unit volume (amount of manganese dioxide) and the discharge capacity and energy density are considerably high as compared with the positive electrode made of only manganese dioxide and the power output is high and the life is long.

<Positive Electrode for Non-Aqueous Electrolyte Secondary Battery>

The positive electrode for the non-aqueous electrolyte secondary battery comprises a lithium-containing composite oxide and a metal oxide dispersed between particles of the lithium-containing composite oxide, and contains additives usually used in the technical field of the non-aqueous electrolyte secondary battery such as electrically conductive member, binding agent and the like, if necessary.

The lithium-containing composite oxide used in the invention is a composite oxide of lithium and a transition metal, and is a substance directly contributing to an electromotive reaction as an active substance for a positive electrode of a non-aqueous electrolyte secondary battery. As the lithium-containing composite oxide are mentioned $LiCoO_2$, $LiNiO_2$ and $LiMn_2O_4$, and these lithium-containing composite oxides may be used alone or in a combination of two or more. The particle size of the lithium-containing composite oxide is 1-60 μm, preferably 20-40 μm. When the particle size is less than 1 μm or more than 60 μm, the packing is deteriorated in the shaping of the positive electrode laminated member (comprising active substance for positive electrode, electrically conductive member and binding agent) or the amount of the active substance for the positive electrode included in a unit volume becomes less, and hence the discharge-recharge capacity may be undesirably decreased.

As the metal oxide used in the invention, mention may be made of titanium oxide, alumina, zinc oxide, chromium oxide, lithium oxide, nickel oxide, copper oxide and iron oxide. They may be used alone or in a combination of two or more. The metal oxide is preferable to be very fine particles, and the particle size thereof is 10 nm to 1 μm, preferably 20 nm to 60 nm. When the particle size is less than 10 nm, it is difficult to industrially synthesize the particles, while when it exceeds 1 μm, the amount of the active substance for the positive electrode per unit volume is decreased and the energy quantity per unit volume is unfavorably reduced.

In the invention, the metal oxide is dispersed between the particles of the lithium-containing composite oxide, so that gaps are produced among the particles of the lithium-containing composite oxide. Since the electrolyte can efficiently penetrate into these gaps, the contact area between the electrolyte and the lithium-containing composite oxide increases, and hence the capacity factor of the lithium-containing composite oxide rises and the discharge-recharge capacity is improved. Among the metal oxides forming the gap in the particles of the lithium-containing composite oxide, titanium oxide is particularly preferable because titanium oxide does not obstruct the cell electrode reaction in the non-aqueous electrolyte secondary battery, and contributes to the stability of the battery by effectively absorbing water but also does not considerably decrease the electric conductivity by the addition (does not raise the internal resistance) and the like.

The mass of the metal oxide in the positive electrode of the invention is preferable to be 0.5% to 4% per the mass of the lithium-containing composite oxide. When the mass of the metal oxide is less than 0.5% per the mass of the lithium-containing composite oxide, the effect of dispersing the metal oxide in the particles of the lithium-containing composite oxide to form the gaps is insufficient, while when it exceeds 4%, the amount of the lithium-containing composite oxide per unit volume decreases, and at the same time, the surfaces of the particles of the lithium-containing composite oxide are covered with the metal oxide to unfavorably decrease the contact are between the electrolyte and the lithium-containing composite oxide.

Among the additives added, if necessary, to the positive electrode of the non-aqueous electrolyte secondary battery according to the invention, the electrically conductive member includes acetylene black and the like, and the binding agent includes polyvinylidene fluoride (PVDF), polytetrafluoroethylene (PTFE) and the like. When using these additives, they may be compounded in the same compounding ratio as in the conventional one, for example, powder for positive electrode:electrically conductive member:binding agent=8:1:1–8:1:0.2 (mass ratio).

The form of the positive electrode is not particularly limited and can be properly selected from well-known forms as the electrode. For example, there are mentioned sheet, column, plate, spiral form and the like.

<Production Method of Positive Electrode for Non-Aqueous Electrolyte Secondary Battery>

Since it is preferable to disperse very fine particles of the metal oxide between the particles of the lithium-containing composite oxide in the positive electrode for the non-aqueous electrolyte secondary battery of the invention, the metal oxide is preferably prepared by a sol-gel method. Moreover, the preparation method is not particularly limited unless very fine particles can be prepared.

The positive electrode for the non-aqueous electrolyte secondary battery of the invention can be produced by the following first to fourth steps. In the first step, a mixed solution is prepared by adding and mixing the lithium-containing composite oxide and an alkoxide of at least one metal selected from the group consisting of titanium, aluminum, zinc, chromium, lithium, nickel, copper and iron in an organic solvent. As the organic solvent, a low boiling point alcohol such as methanol, ethanol or the like and a low boiling point ketone such as acetone or the like are preferable, and particularly ethanol is preferable. As an alkoxy group in the metal alkoxide, isopropoxy group, n-propoxy group and the like are preferable from a viewpoint of the solubility of the metal alkoxide to the organic solvent.

In the second step, water is added to the mixed solution prepared in the first step to produce a metal hydroxide corresponding to the metal alkoxide by a hydrolysis reaction of the metal alkoxide. Moreover, it is preferable to conduct the second step with ice cooling.

In the third step, the solution containing the metal hydroxide is heated and dried to change the metal hydroxide into a metal oxide while removing the solvent, whereby powder for a positive electrode obtained by dispersing the metal oxide between the particles of the lithium-containing composite oxide is produced. Moreover, in order to completely conduct the removal of the solvent and the dehydration, it is preferable to conduct the heating and drying at a temperature of 120-300° C. for a sufficient time.

In the fourth step, the powder for the positive electrode obtained at the third step is shaped into a given form to obtain a positive electrode for a non-aqueous electrolyte secondary battery. The shaping method is not particularly limited unless the positive electrode having a strength to an extent of causing no breakage in the production course of the non-aqueous electrolyte secondary battery can be shaped, and hence the conventionally known methods can be used. For example, it can be carried out by mixing and milling the powder for the positive electrode with the aforementioned additives such as electrically conductive member, binding agent and the like and the organic solvent such as ethyl acetate, ethanol or the like and then rolling through rolls to prepare a sheet having desired thickness and width.

The positive electrode obtained by the above method is a positive electrode of a non-aqueous electrolyte secondary battery in which very fine particles of the metal oxide are dispersed between the particles of the lithium-containing composite oxide without largely decreasing the amount of the active substance for the positive electrode per unit volume (amount of lithium-containing composite oxide) and the discharge-recharge capacity is considerably high as compared with the positive electrode made of only the lithium-containing composite oxide.

<Non-Aqueous Electrolyte Battery>

The non-aqueous electrolyte battery according to the invention comprises the aforementioned positive electrode, a negative electrode and an electrolyte comprising an aprotic organic solvent and a support salt, and is provided with members usually used in the technical field of the non-aqueous electrolyte battery such as a separator and the like, if necessary.

—Negative Electrode—

The negative electrode material in the non-aqueous electrolyte battery according to the invention is partly different between a primary battery and a secondary battery. For example, a lithium metal itself, lithium alloy and so on are mentioned as the negative electrode of the non-aqueous electrolyte primary battery. As a metal forming the alloy with lithium are mentioned Sn, Pb, Al, Au, Pt, In, Zn, Cd, Ag, Mg and so on. Among them, Al, Zn and Mg are preferable from a viewpoint of much reserve and toxicity. These materials may be used alone or in a combination of two or more.

On the other hand, lithium metal itself, an alloy of lithium with Al, In, Pb, Zn or the like, carbon material such as graphite doped with lithium and so on are preferably mentioned as the negative electrode of the non-aqueous electrolyte secondary battery. Among them, the carbon material such as graphite or the like is preferable in view of a higher safety. These materials may be used alone or in a combination of two or more.

The form of the negative electrode is not particularly limited and can be properly selected from the well-known forms similar to the above forms of the positive electrode.

Non-Aqueous Electrolyte

The electrolyte of the non-aqueous electrolyte battery according to the invention comprises an aprotic organic solvent and a support salt. The negative electrode of the non-aqueous electrolyte battery is very high in the reactivity to water because it contains an alkali metal such as lithium or the like as previously mentioned, so that the aprotic organic solvent not reacting with water is used as a solvent. The aprotic organic solvent is made possible to reduce the viscosity of the electrolyte and can easily attain an optimum ion conductivity as a battery.

Aprotic Organic Solvent

The aprotic organic solvent constituting the electrolyte of the non-aqueous electrolyte battery according to the invention does not react with lithium or lithium alloy used in the negative electrode. The aprotic organic solvent is not particularly limited, but includes ether compounds, ester compounds and so on from a viewpoint that the viscosity of the electrolyte is controlled to a low value. Concretely, there are preferably mentioned 1,2-dimethoxyethane (DME), tetrahydrofuran, dimethyl carbonate, diethyl carbonate (DEC), diphenyl carbonate, ethylene carbonate (EC), propylene carbonate (PC), γ-butyrolactone (GBL), γ-valerolactone, methylethyl carbonate, ethylmethyl carbonate and so on.

Among them, in case of the non-aqueous electrolyte primary battery, the cyclic ether compound such as propylene carbonate, γ-butyrolactone or the like, the chain ester compound such as dimethyl carbonate, methylethyl carbonate or the like, and the chain ether compound such as 1,2-dimethoxyethane or the like are preferable, and in case of the non-aqueous electrolyte secondary battery, the cyclic ester compound such as ethylene carbonate, propylene carbonate, γ-butyrolactone or the like, the chain ester compound such as dimethyl carbonate, ethylmethyl carbonate, diethyl carbonate or the like, and the chain ether compound such as 1,2-dimethoxy ethane or the like are preferable. The cyclic ester compound is high in the specific dielectric constant and is preferable in a point that the solubility of the support salt is excellent, while the chain ester compound and ether compound are low in the viscosity and are preferable in a point that the viscosity of the electrolyte is made low. These compounds may be used alone or in a combination of two or more.

Support Salt

As the support salt is preferable a support salt corresponding to an ion source for lithium ion, or the like. The ion source for lithium ion is not particularly limited, but there are preferably mentioned lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and so on. They may be used alone or in a combination of two or more.

The content of the support salt in the electrolyte is preferably 0.2-1.5 mol, more preferably 0.5-1 mol per 1 L of a solvent component in the electrolyte in case of the primary battery, and is preferably 0.2-1 mol, more preferably 0.5-1 mol per 1 kg of the solvent component in the electrolyte in case of the secondary battery. When the content is less than 0.2 mol, the sufficient electric conductivity of the electrolyte can not be ensured and hence the discharge characteristic of the battery in the primary battery may cause trouble in the primary battery and the discharge-recharge characteristic of the battery may cause trouble in the secondary battery. While, when it exceeds 1 mol, the viscosity of the electrolyte rises and the sufficient mobility of lithium ion can not be ensured, and hence the sufficient electric conductivity of the electrolyte can not be ensured as mentioned above and the solution resistance rises, and as a result, the pulse discharge and the low-temperature characteristic may cause trouble in the primary battery and the discharge-recharge characteristic may cause trouble in the secondary battery.

Phosphazene Derivative and Isomer of Phosphazene Derivative

It is preferable to add a phosphazene derivative and/or an isomer of a phosphazene derivative to the aprotic organic solvent.

In the non-aqueous electrolyte primary battery, the discharge capacity and energy density of the non-aqueous electrolyte primary battery can be improved by dispersing the specified metal oxide between the particles of manganese dioxide as previously mentioned, but further the discharge capacity and energy density can be more improved by adding the phosphazene derivative and/or the isomer of the phosphazene derivative to the aprotic organic solvent, and hence there is obtained a lithium primary battery having a high power output and a long life.

Also, the conventional electrolyte based on the aprotic organic solvent in the non-aqueous electrolyte primary battery is high in the risk that when a large current violently flows in the short-circuiting or heat abnormally generates in the battery, the electrolyte is vaporized and decomposed to generate a gas or cause explosion-ignition of the battery through gas and heat generated, or high in the risk that the electrolyte catches sparks produced in the short-circuiting to cause ignition-explosion. If the phosphazene derivative is included in the conventional electrolyte, however, the vaporization-decomposition or the like of the electrolyte is suppressed at a relatively low temperature of not higher than about 200° C. to reduce the risk of ignition-fire and also even if ignition is caused in the interior of the battery by fusion or the like of the negative electrode material, the risk of the fire becomes lower. Further, phosphorus has an action of suppressing a chain decomposition of a high polymer material constituting the battery, so that the risk of ignition-fire is effectively reduced. In addition, if the phosphazene derivative is contained in the conventional electrolyte, it is possible to provide a non-aqueous electrolyte primary battery having excellent low-temperature and high-temperature characteristics. Moreover, phosphazene has a potential window sufficiently functioning as a primary battery and is not decomposed by the discharge. Also, phosphazene containing a halogen (e.g. fluorine) functions as a catching agent for active radical just in case of combustion, while phosphazene containing an organic substituent produces a carbide (char) on an electrode material and a separator in the combustion and has an effect of shielding oxygen. In addition, even if the recharging is accidentally conducted by a user, since phosphazene has an effect of controlling the formation of dendrite, the safety becomes higher as compared with the case of adding no phosphazene.

On the other hand, in the non-aqueous electrolyte secondary battery, the discharge-recharge capacity of the non-aqueous electrolyte secondary battery can be improved by dispersing the specified metal oxide between the particles of the lithium-containing composite oxide as previously mentioned, but further the discharge-recharge capacity can be more improved by adding the phosphazene derivative and/or the isomer of the phosphazene derivative to the aprotic organic solvent.

Also, the conventional electrolyte based on the aprotic organic solvent in the non-aqueous electrolyte secondary battery is high in the risk that when a large current violently flows in the short-circuiting or heat abnormally generates in the battery, the electrolyte is vaporized and decomposed to generate a gas or cause explosion-ignition of the battery through gas and heat generated. If the phosphazene derivative is included in the conventional electrolyte, however, the vaporization-decomposition or the like of the electrolyte is suppressed at a relatively low temperature of not higher than about 200° C. to reduce the risk of ignition-fire. Further, even if ignition is caused in the interior of the battery by fusion or the like of the negative electrode material, the risk of the fire becomes lower. Furthermore, phosphorus has an action of suppressing a chain decomposition of a high polymer material constituting the battery, so that the risk of ignition-fire is effectively reduced and it is possible to provide a non-aqueous electrolyte secondary battery having excellent battery characteristics such as high voltage, high discharge capacity, large current discharge characteristic and the like. Moreover, phosphazene containing a halogen (e.g. fluorine) functions as a catching agent for active radical just in case of combustion, while phosphazene containing an organic substituent produces a carbide (char) on an electrode material and a separator in the combustion and has an effect of shielding oxygen. In addition, even in the recharging, since phosphazene has an effect of controlling the formation of dendrite, the safety becomes higher as compared with the case of adding no phosphazene.

In the invention, the risk of ignition-fire is evaluated by measuring an oxygen index according to JIS K7201. Moreover, the term "oxygen index" means a value of a minimum oxygen concentration represented by a volume percentage required for holding the combustion of the material under given test conditions defined in JIS K7201, in which when the oxygen index is low, the risk of ignition-fire is high, while when the oxygen index is high, the risk of ignition-fire is low. In the invention, the risk of ignition-fire is evaluated by a limit oxygen index based on the above oxygen index.

The electrolyte added with the phosphazene derivative and/or the isomer of the phosphazene derivative is preferable to be a limit oxygen index of not less than 21 volume %. When the limit oxygen index is less than 21 volume %, the effect of suppressing the ignition-fire may be insufficient. Since the oxygen index under atmosphere condition corresponds to 20.2 volume %, the limit oxygen index of 20.2 volume % means that combustion occurs in air. The inventors have made various examinations and found that the electrolyte has a self-extinguishing characteristic at a limit oxygen index of not less than 21 volume %, a flame retardance at a limit oxygen index of not less than 23 volume %, and an incombustibility at a limit oxygen index of not less than 25 volume %.

Moreover, the terms "self-extinguishing characteristic, flame retardance and incombustibility" used herein are characteristics defined by a method according to UL94HB method. After a test specimen of 127 mm×12.7 mm is prepared by impregnating 1.0 mL of the electrolyte into an incombustible quartz fibers, when the test specimen is ignited under air environment, the self-extinguishing characteristic is a case that the ignited flame is extinguished at a line from 25 mm to 100 mm and the ignition is not observed in an object fallen down from a net, and the flame retardance is a case that the ignited flame does not arrive a line of 25 mm in the device and the ignition is not observed in an object fallen down from a net, and the incombustibility is a case that the ignition is not observed (combustion length: 0 mm).

The phosphazene derivative to be added to the aprotic organic solvent is not particularly limited, but phosphazene derivatives having a viscosity at 25° C. of not more than 300 mPa·s (300 cP) and represented by the following formula (I) or (II) are preferable from a viewpoint that the viscosity is relatively low and the support salt is well dissolved:

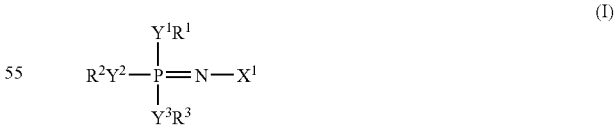

(I)

(wherein $R^1$, $R^2$ and $R^3$ are independently a monovalent substituent or a halogen element; $X^1$ is an organic group containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond)

(II)

(wherein $R^4$ is independently a monovalent substituent or a halogen element; and n is 3 to 15).

As the viscosity at 25° C. of the phosphazene derivative represented by the formula (I) or (II), it is required to be not more than 300 mPa·s (300 cP). The viscosity is preferably not more than 100 mPa·s (100 cP), further preferably not more than 20 mPa·s (20 cP), particularly not more than 5 mPa·s (5 cP). When the viscosity exceeds 300 mPa·s (300 cP), the support salt is hardly dissolved, and the wettability to the positive electrode material, separator or the like lowers, and the ion conductivity considerably lowers due to the increase of the viscous resistance of the electrolyte, and particularly the performances become lacking in the use under a lower-temperature condition below freezing point or the like.

In the formula (I), $R^1$, $R^2$ and $R^3$ are not particularly limited unless they are monovalent substituent or halogen element. As the monovalent substituent are mentioned an alkoxy group, an alkyl group, a carboxyl group, an acyl group, an aryl group and so on. Among them, the alkoxy group is preferable in a point that the viscosity of the electrolyte can be reduced. As the halogen element are mentioned fluorine, chlorine, bromine and so on. All of $R^1$-$R^3$ may be the same kind of the substituents, or some of them may be different kinds of the substituents.

As the alkoxide group are mentioned, for example, methoxy group, ethoxy group, propoxy group, butoxy group, an alkoxy-substituted alkoxy group such as methoxyethoxy group, methoxyethoxyethoxy group or the like, and so on. Among them, methoxy group, ethoxy group, methoxyethoxy group or methoxyethoxyethoxy group is preferable as all of $R^1$-$R^3$, and particularly methoxy group or ethoxy group is preferable from a viewpoint of low viscosity and high dielectric constant. As the alkyl group are mentioned methyl group, ethyl group, propyl group, butyl group, pentyl group and so on. As the acyl group are mentioned formyl group, acetyl group, propionyl group, butyryl group, isobutyryl group, valeryl group and so on. As the aryl group are mentioned phenyl group, tolyl group, naphthyl group and so on. In these monovalent substituents, a hydrogen element is preferable to be substituted with a halogen element, in which fluorine, chlorine and bromine are preferable as the halogen element, and among them fluorine is most preferable and chlorine is next preferable. In the secondary battery, the cycling characteristic tends to become good in case of using fluorine as compared with chlorine.

In the formula (I), as the bivalent connecting group in $Y^1$, $Y^2$ and $Y^3$, there are mentioned, for example, $CH_2$ group as well as a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group and a bivalent connecting group containing at least one of oxygen, sulfur, selenium and nitrogen are preferable, and a bivalent connecting group containing sulfur and/or selenium is particularly preferable. Also, $Y^1$, $Y^2$ and $Y^3$ may be a bivalent element such as oxygen, sulfur, selenium or the like, or a single bond. All of $Y^1$-$Y^3$ may be the same kind, or some of them may be different kinds with each other.

In the formula (I), as $X^1$ is preferable an organic group containing at least one element selected from the group consisting of carbon, silicon, nitrogen, phosphorus and sulfur from a viewpoint of the care for hazardous characteristic, environment and the like. Among the organic groups, an organic group having a structure represented by the following formula (VIII), (IX) or (X) is more preferable.

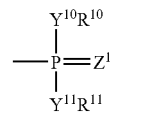

(VIII)

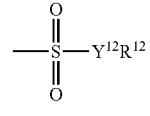

(IX)

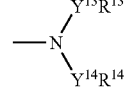

(X)

In the formulae (VIII), (IX) and (X), $R^{10}$-$R^{14}$ are independently a monovalent substituent or a halogen element. $Y^{10}$-$Y^{14}$ are independently a bivalent connecting group, a bivalent element or a single bond, and $Z^1$ is a bivalent group or a bivalent element.

As $R^{10}$-$R^{14}$ in the formulae (VIII), (IX) and (X) are preferably mentioned the same monovalent substituents or halogen elements as described in $R^1$-$R^3$ of the formula (I). Also, they may be the same kind or some different kinds in the same organic group. $R^{10}$ and $R^{11}$ of the formula (VIII) or $R^{13}$ and $R^{14}$ of the formula (X) may be bonded to each other to form a ring.

As $Y^{10}$-$Y^{14}$ in the formulae (VIII), (IX), and (X) are mentioned the same bivalent connecting groups or bivalent elements and the like as described in $Y^1$-$Y^3$ of the formula (I). As mentioned above, the group containing sulfur and/or selenium is particularly preferable because the risk of ignition-fire is reduced. They may be the same kind or some different kinds in the same organic group.

In the formula (VIII), as $Z^1$ are mentioned, for example, $CH_2$ group, CHR group (R is an alkyl group, an alkoxyl group, a phenyl group or the like, and so forth on.), NR group as well as a bivalent group containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel and so on. Among them, $CH_2$ group, CHR group, NR group and a bivalent group containing at least one element selected from the group consisting of oxygen, sulfur and selenium are preferable. Particularly, a bivalent group containing sulfur and/or selenium is preferable because the risk of ignition-fire is reduced. Also, $Z^1$ may be a bivalent element such as oxygen, sulfur, selenium or the like.

As the organic group, an organic group containing phosphorus as represented by the formula (VIII) is particularly preferable in a point that the risk of ignition-fire can be effectively reduced. Also, an organic group containing sulfur as represented by the formula (IX) is particularly preferable in a point that the interfacial resistance of the electrolyte is made small.

In the formula (II), $R^4$ is not particularly limited unless it is a monovalent substituent or a halogen element. As the monovalent substituent are mentioned an alkoxy group, an alkyl group, a carboxyl group, an acyl group, an aryl group and so on. Among them, the alkoxy group is preferable in a point that the viscosity of the electrolyte can be made low. As the halogen element are preferably mentioned fluorine, chlorine, bromine and so on. As the alkoxy group are mentioned, for example, methoxy group, ethoxy group, methoxyethoxy group, propoxy group, phenoxy group and so on. Among them, methoxy group, ethoxy group, n-propoxy group and phenoxy group are particularly preferable in case of the non-aqueous electrolyte primary battery, and methoxy group, ethoxy group, methoxyethoxy group and phenoxy group are particularly preferable in case of the non-aqueous electrolyte secondary battery. In these monovalent substituents, hydrogen element is preferable to be substituted with a halogen element, in which fluorine, chlorine, bromine and the like are preferably mentioned as the halogen element. As a substituent substituted with fluorine is mentioned, for example, trifluoroethoxy group.

By properly selecting $R^1$-$R^4$, $R^{10}$-$R^{14}$, $Y^1$-$Y^3$, $Y^{10}$-$Y^{14}$ and $Z^1$ in the formulae (I), (II), (VIII)-(X), it is possible to synthesize phosphazene derivatives having a more preferable viscosity, a solubility suitable for adding-mixing and the like. These phosphazene derivatives may be used alone or in a combination of two or more.

Among the phosphazene derivatives of the formula (II), a phosphazene derivative represented by the following formula (III):

$$(NPF_2)_n \qquad (III)$$

(wherein n is 3 to 13) is particularly preferable from a viewpoint that the viscosity of the electrolyte is made low to improve low-temperature characteristics of the battery and further improve the resistance to deterioration and safety of the electrolyte.

The phosphazene derivative of the formula (III) is a low-viscosity liquid at room temperature (25° C.) and has an action of depressing a freezing point. Therefore, by adding the phosphazene derivative to the electrolyte, it is made possible to give excellent low-temperature characteristics to the electrolyte, and the reduction of the viscosity of the electrolyte is attained, and it is possible to provide a non-aqueous electrolyte battery having a low internal resistance and a high electric conductivity. For this end, it is possible to provide a non-aqueous electrolyte battery particularly indicating an excellent discharge characteristic over a long time of period even in the use under low-temperature conditions in a low temperature area or season.

In the formula (III), n is preferably 3-5, further preferably 3-4, particularly 3 in a point that the excellent low-temperature characteristic can be given to the electrolyte and the viscosity of the electrolyte may be made low. When the value of n is small, the boiling point is low, and the characteristic of preventing ignition in the approaching of flame can be improved. On the other hand, as the value of n becomes larger, the boiling point becomes high and the electrolyte can be stably used even at a higher temperature. In order to obtain performances to be targeted by utilizing the above nature, it is also possible to properly select and use plural phosphazene.

By properly selecting the value of n in the formula (III), it is made possible to prepare an electrolyte having a more preferable viscosity, solubility suitable for mixing, low-temperature characteristics and so on. These phosphazene derivatives may be used alone or in a combination of two or more.

The viscosity of the phosphazene derivative represented by the formula (III) is not particularly limited unless it is not more than 20 mPa·s (20 cP), but it is preferably not more than 10 mPa·s (10 cP), more preferably not more than 5 mPa·s (5 cP) from a viewpoint of the improvement of the electric conductivity and the improvement of the low-temperature characteristics. Moreover, the viscosity in the invention is determined by using a viscosity measuring meter (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity under the revolution rate when an indication value is 50-60% as an analytical condition.

Among the phosphazene derivatives of the formula (II), a phosphazene derivative represented by the following formula (IV):

$$(NPR^5_2)_n \qquad (IV)$$

(wherein $R^5$ is independently a monovalent substituent or fluorine, and at least one of all $R^5$s is a fluorine-containing monovalent substituent or fluorine, and n is 3-8, provided that all $R^5$s are not fluorine) is particularly preferable from a viewpoint that the resistance to deterioration and safety of the electrolyte are improved.

When the electrolyte contains the phosphazene derivative of the formula (II), the excellent self-extinguishing characteristic or flame retardance can be given to the electrolyte to improve the safety of the electrolyte. If the electrolyte contains a phosphazene derivative of the formula (IV) in which at least one of all $R^5$s is a fluorine-containing monovalent substituent, it is possible to give a more excellent safety to the electrolyte. Furthermore, if the electrolyte contains a phosphazene derivative of the formula (IV) in which at least one of all $R^5$s is fluorine, it is possible to give a further excellent safety. That is, the phosphazene derivative of the formula (IV) in which at least one of all $R^5$s is the fluorine-containing monovalent substituent or fluorine has an effect of hardly combusting the electrolyte as compared with the phosphazene derivative containing no fluorine, and can give the further excellent safety to the electrolyte.

Moreover, a cyclic phosphazene derivative of the formula (IV) in which all $R^5$s are fluorine and n is 3 is incombustible, so that it is large in the effect of preventing ignition in the approaching of flame, but since the boiling point is very low, if this derivative is completely vaporized, the reaming aprotic organic solvent undesirably combusts.

As the monovalent substituent in the formula (IV) are mentioned an alkoxy group, an alkyl group, an acyl group, an aryl group, a carboxyl group and so on, but the alkoxy group is preferable in a point that the improvement of the safety in the electrolyte is particularly excellent. As the alkoxy group are mentioned methoxy group, ethoxy group, n-propoxy group, i-propoxy group, butoxy group and so on, and alkoxy-substituted alkoxy groups such as methoxyethoxy group and the like. Particularly, methoxy group, ethoxy group and n-propoxy group are preferable in a point that the improvement of the safety in the electrolyte is excellent. Also, methoxy group is preferable in a point that the viscosity of the electrolyte is made low.

In the formula (IV), n is preferably 3-5, further preferably 3-4 in a point that the excellent safety can be given to the electrolyte.

The monovalent substituent is preferable to be substituted with fluorine. When all of $R^5$s in the formula (IV) are not fluorine, at least one monovalent substituent contains fluorine.

The content of fluorine in the phosphazene derivative is preferably 3-70% by weight, more preferably 7-45% by weight. When the content is within the above range, "excellent safety" as an effect inherent to the invention can be preferably developed.

As a molecular structure of the phosphazene derivative represented by the formula (IV), a halogen element such as chlorine, bromine or the like may be also included in addition to fluorine. However, fluorine is most preferable, and chlorine is next preferable. In the secondary battery, the cycle characteristic tends to become good in the use of fluorine as compared with chlorine.

By properly selecting $R^5$ and the value of n in the formula (IV), it is made possible to prepare an electrolyte having a more preferable viscosity, a solubility suitable for mixing and the like. These phosphazene derivatives may be used alone or in a combination of two or more.

The viscosity of the phosphazene derivative of the formula (IV) is not particularly limited unless it is not more than 20 mPa·s (20 cP), but it is preferably not more than 10 mPa·s (10 cP), more preferably not more than 5 mPa·s (5 cP) from a viewpoint of the improvement of the electric conductivity and the improvement of the low-temperature characteristics.

As the phosphazene derivative added to the aprotic organic solvent is preferable a phosphazene derivative being a solid at 25° C. (room temperature and represented by the following formula (V):

$$(NPR^6{}_2)_n \qquad (V)$$

(wherein $R^6$ is independently a monovalent substituent or a halogen element, and n is 3-6) from a viewpoint that the resistance to deterioration and safety of the electrolyte are improved while suppressing the rise of the viscosity in the electrolyte.

Since the phosphazene derivative of the formula (V) is solid at room temperature (25° C.), when this derivative is added to the electrolyte, it is dissolved into the electrolyte to raise the viscosity of the electrolyte. However, when it is added in a given amount as mentioned later, there is obtained a non-aqueous electrolyte battery in which the viscosity rising ratio in the electrolyte is low, and the internal resistance is low and the electric conductivity is high. In addition, the phosphazene derivative of the formula (V) is dissolved in the electrolyte, so that the stability of the electrolyte is excellent over a long time of period.

In the formula (V), $R^6$ is not particularly limited unless it is a monovalent substituent or a halogen element. As the monovalent substituent are mentioned an alkoxy group, an alkyl group, a carboxyl group, an acyl group, an aryl group and so on. As the halogen element are preferably mentioned halogen elements such as fluorine, chlorine, bromine, iodine and the like. Among them, the alkoxy group is particularly preferable in a point that the viscosity rise of the electrolyte can be suppressed. As the alkoxy group are preferable methoxy group, ethoxy group, methoxyethoxy group, propoxy group (isopropoxy group, n-propoxy group), phenoxy group, trifluoroethoxy group and so on. Particularly, methoxy group, ethoxy group, propoxy group (isopropoxy group, n-propoxy group), phenoxy group and trifluoroethoxy group are more preferable in a point that the viscosity rise of the electrolyte can be suppressed. The monovalent substituent is preferable to contain the above halogen element.

In the formula (V), n is particularly preferable 3 or 4 in a point that the viscosity rise of the electrolyte can be suppressed.

As the phosphazene derivative of the formula (V) are particularly preferable a structure in which $R^6$ is methoxy group and n is 3 in the formula (V), a structure in which $R^6$ is at least either methoxy group or phenoxy group and n is 4 in the formula (V), a structure in which $R^6$ is ethoxy group and n is 4 in the formula (V), a structure in which $R^6$ is isopropoxy group and n is 3 or 4 in the formula (V), a structure in which $R^6$ is n-propoxy group and n is 4 in the formula (V), a structure in which $R^6$ is trifluoroethoxy group and n is 3 or 4 in the formula (V), a structure in which $R^6$ is phenoxy group and n is 3 or 4 in the formula (V) in a point that the viscosity rise of the electrolyte can be suppressed.

By properly selecting each substituent and the value of n in the formula (V), it is made possible to prepare an electrolyte having a more preferable viscosity, a solubility suitable for mixing and the like. These phosphazene derivatives may be used alone or in a combination of two or more.

An isomer of a phosphazene derivative added to the aprotic organic solvent is not particularly limited, but an isomer represented by the following formula (VI) and of a phosphazene derivative represented by the following formula (VII):

(wherein $R^7$, $R^8$ and $R^9$ in the formulae (VI) and (VII) are independently a monovalent substituent or a halogen element; $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; $Y^7$ and $Y^8$ are independently a bivalent connecting group, a bivalent element or a single bond) is preferable form w viewpoint that the low-temperature characteristics of the non-aqueous electrolyte battery are improved and further the resistance to deterioration and the safety of the electrolyte are improved.

When the isomer represented by the formula (VI) and of the phosphazene derivative represented by the formula (VII) is added to the electrolyte, it can develop very excellent low-temperature characteristics in the electrolyte.

In the formula (VI), $R^7$, $R^8$ and $R^9$ are not particularly limited unless they are the monovalent substituent or the halogen element. As the monovalent substituent are mentioned an alkoxy group, an alkyl group, a carboxyl group, an acyl group, an aryl group and so on. As the halogen element are preferably mentioned halogen elements such as fluorine, chlorine, bromine and the like. Among them, fluorine, alkoxy group and the like are particularly preferable in view of the low-temperature characteristics and electrochemical stability of the electrolyte. Also, fluorine, alkoxy group and fluorine-containing alkoxy group are preferable in a point that the viscosity of the electrolyte is made low. All of $R^7$-$R^9$ may be the same kind of the substituents, or some of them may be different kind of the substituents.

As the alkoxy group are mentioned methoxy group, ethoxy group, propoxy group, butoxy group and so on as well as alkoxy-substituted alkoxy group such as methoxyethoxy group, methoxyethoxyethoxy group or the like, and so on. Among them, methoxy group, ethoxy group, methoxyethoxy group or methoxyethoxyethoxy group is preferable as all of $R^7$-$R^9$, and particularly methoxy group or ethoxy group is preferable from a viewpoint of low viscosity and high dielectric constant. As the alkyl group are mentioned methyl group, ethyl group, propyl group, butyl group, pentyl group and so on. As the acyl group are mentioned formyl group, acetyl group, propionyl group, butylyl group, isobutylyl group, valeryl group and so on. As the aryl group are mentioned phenyl group, tolyl group, naphthyl group and so on. In these substituents, hydrogen element is preferable to be substituted with a halogen element, in which fluorine, chlorine and bromine are preferable as the halogen element. Among them, fluorine is particularly preferable and chlorine is next preferable. In the secondary battery, the cycle characteristic tends to become good in the use of fluorine as compared with chlorine.

As the bivalent connecting group represented by $Y^7$ and $Y^8$ in the formula (VI) are mentioned $CH_2$ group and a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantrum, bismuth, chromium, molybdenum, tellurium, polonium, tungsten, iron, cobalt and nickel. Among them, $CH_2$ group and the bivalent connecting group containing at least one element selected from the group consisting of oxygen, sulfur, selenium and nitrogen are preferable. Also, $Y^7$ and $Y^8$ may be a bivalent element such as oxygen, sulfur, selenium or the like, or a single bond. The bivalent connecting group containing sulfur and/or oxygen, oxygen element and sulfur element are particularly preferable in a point that the safety of the electrolyte is improved, and the bivalent connecting group containing oxygen and oxygen element are particularly preferable in a point that the low-temperature characteristics of the electrolyte are excellent. $Y^7$ and $Y^8$ may be the same kind or different kinds with each other.

As $X^2$ in the formula (VI), a substituent containing at least one element selected from the group consisting of carbon, silicon, nitrogen, phosphorus, oxygen and sulfur is preferable from a viewpoint of the care for hazardous characteristic, environment and the like, and a substituent having a structure represented by the following formula (XI), (XII) or (XIII) are more preferable.

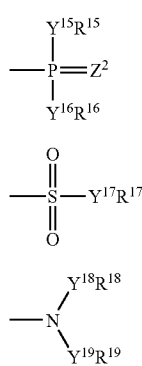

In the formulae (XI), (XII) and (XIII), $R^{16}$-$R^{19}$ are independently a monovalent substituent or a halogen element. $Y^{15}$-$Y^{19}$ are independently a bivalent connecting group, a bivalent element or a single bond, and $Z^2$ is a bivalent group or a bivalent element.

As $R^{16}$-$R^{19}$ in the formulae (XI), (XII) and (XIII) are preferably mentioned the same monovalent substituents and halogen elements as described in $R^7$-$R^9$ of the formula (VI). Also, they may be the same kind or some different kinds in the same substituent. $R^{15}$ and $R^{16}$ in the formula (XI) or $R^{18}$ and $R^{19}$ in the formula (XIII) may be bonded to each other to form a ring.

As the group represented by $Y^{15}$-$Y^{19}$ in the formulae (XI), (XII) and (XIII) are mentioned the same bivalent connecting groups, bivalent elements as described in $Y^7$-$Y^8$ of the formula (VI). The bivalent connecting group containing sulfur and/or oxygen, sulfur element and oxygen element are particularly preferable in a point that the safety of the electrolyte is improved likewise the aforementioned case. Also, the bivalent connecting group containing oxygen and oxygen element are particularly preferable in a point that the low-temperature characteristics are excellent. They may be the same kind or some different kinds in the same substituent.

As $Z^2$ in the formula (XI) are mentioned, for example, $CH_2$ group, CHR' group (R' is an alkyl group, an alkoxy group, a phenyl group or the like, and so forth on), NR' group as well as bivalent groups containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group, CHR' group, NR' group and bivalent groups containing at least one element selected from the group consisting of oxygen, sulfur and selenium are preferable. Also, $Z^2$ may be a bivalent element such as oxygen, sulfur, selenium or the like. Particularly, the bivalent group containing sulfur and/or selenium, sulfur element and selenium element are preferable in a point that the safety of the electrolyte is improved. Also, the bivalent connecting group containing oxygen and oxygen element are particularly preferable in a point that the low-temperature characteristics are excellent.

As these substituents is particularly preferable a substituent containing phosphorus as represented by the formula (XI) in a point that the safety can be effectively improved. Further, when $Z^2$, $Y^{15}$ and $Y^{16}$ in the formula (XI) are oxygen element, it is particularly possible to develop very excellent low-temperature characteristics in the electrolyte. Moreover, when the substituent is a sulfur-containing substituent as represented by the formula (XII), it is particularly preferable that the interfacial resistance of the electrolyte is made small.

By properly selecting $R^7$-$R^9$, $R^{15}$-$R^{19}$, $Y^7$-$Y^8$, $Y^{15}$-$Y^{19}$ and $Z^2$ in the formulae (VI) and (XI)-(XIII), it is made possible to prepare an electrolyte having a more preferable viscosity, solubility suitable for adding and mixing, low-temperature characteristics and the like. These compounds may be used alone or in a combination of two or more.

The isomer represented by the formula (VI) is an isomer of a phosphazene derivative represented by the formula (VII) and can be produced, for example, by adjusting a vacuum degree and/or a temperature in the production of the phosphazene derivative represented by the formula (VII). The content (volume %) of the isomer in the electrolyte can be measured by the following measuring method.

<<Measuring Method>>

It can be measured by finding a peak area of a sample through a gel permeation chromatography (GPC) or a high-speed liquid chromatography, comparing the found peak area with a previously found area per mole of the isomer to obtain a molar ratio, and further converting into a volume while considering a specific gravity.

As the phosphazene derivative represented by the formula (VII), it is preferable that the viscosity is relatively low and the support salt can be well dissolved. As $R^7$-$R^9$, $Y^7$-$Y^8$ and $X^2$ in the formula (VII) are preferably mentioned the same as described in the explanation on $R^7$-$R^9$, $Y^7$-$Y^8$ and $X^2$ of the formula (VI).

As the phosphazene derivative represented by the formula (I), (II), (V) or (VII) or the isomer represented by the formula (VI), it is preferable to contain a halogen element containing substituent in its molecular structure. When the halogen element containing substituent is existent in the molecular structure, even if the content of the phosphazene derivative or the isomer is small, it is possible to effectively reduce the risk of ignition-fire of the electrolyte by a halogen gas derived therefrom. Moreover, the occurrence of halogen radical may come into problem in case of the compound containing a halogen element in its substituent. However, such a problem is not caused in case of the above phosphazene derivative or the isomer of the phosphazene derivative because phosphorus element in the molecular structure catches the halogen radical to form a stable phosphorus halide.

The content of the halogen element in the phosphazene derivative or the isomer of the phosphazene derivative is preferably 2-80% by weight, more preferably 2-60% by weight, further preferably 2-50% by weight. When the content is less than 2% by weight, the effect by including the halogen element may not sufficiently be developed, while when it exceeds 80% by weight, the viscosity becomes higher and the electric conductivity may lower in the addition to the electrolyte.

In the phosphazene derivatives represented by the formulae (I), (II), (IV), (V) and (VII), a flash point is not particularly limited, but it is preferably not lower than 100° C., more preferably not lower than 150° C. from a viewpoint of the control of fire and the like. On the other hand, the phosphazene derivative represented by the formula (III) has no flash point. The term "flash point" used herein means such a temperature that a flame is broadened on a surface of a substance and covers at least 75% of the surface of the substance. The flash point is a scale looking a tendency of forming a combustible mixture with air. When the phosphazene derivative has a flash point of not lower than 100° C. or has no flash point, the fire or the like is suppressed, and also if the fire or the like is caused in an interior of a battery, it is possible to reduce the risk of outblazing over the surface of the electrolyte by ignition.

When the phosphazene derivative of the formula (III) or (V), or the isomer of the formula (VI) and the phosphazene derivative of the phosphazene derivative of the formula (VII) are added to the electrolyte, the decomposition of the support salt is controlled and the electrolyte is considerably stabilized. In the conventional electrolyte used in the non-aqueous electrolyte battery and containing an ester-based organic solvent and a support salt as a lithium ion source, the support salt is decomposed with a lapse of time and the decomposed mass may be reacted with a slight amount of water or the like existing in the organic solvent to reduce the electric conductivity of the electrolyte or cause the deterioration of the electrode material. On the contrary, when the phosphazene derivative or the isomer of the phosphazene derivative is added to the conventional electrolyte, the decomposition of the support salt is controlled to considerably improve the stability of the electrolyte. As the support salt for the non-aqueous electrolyte primary battery are usually used $LiBF_4$, $LiPF_6$, $LiCF_3SO_3$, $Li(C_2F_5SO_2)_2N$, $Li(CF_3SO_2)_2N$ and so on. Among them, $LiCF_3SO_3$, $Li(C_2F_5SO_2)_2N$ and $Li(CF_3SO_2)_2N$ are preferable because the hydrolysis of the support salt itself is low. However, $LiBF_4$ and $LiPF_6$ can be preferably used by the above action of the phosphazene.

The content of the phosphazene derivative and the isomer of the phosphazene derivative in the electrolyte is shown below. From a viewpoint of "limit oxygen index", the content of the phosphazene derivative represented by the formula (I) or (II) to the electrolyte is preferably not less than 5% by volume, more preferably 10-50% by volume. By adjusting the content to a value within the above numerical range is effectively reduced the risk of ignition-fire of the electrolyte. Although the risk of fire is effectively reduced, the range of the content differs in accordance with the kind of the support salt and the kind of the electrolyte used. Concretely, the system used is optimized by properly selecting the content so as to control the viscosity to a lowest value and render the limit oxygen index into not less than 21% by volume.

From a viewpoint of "safety" in the electrolyte, the content of the phosphazene derivative of the formula (III) is preferably not less than 5% by volume, and the content of the phosphazene derivative of the formula (IV) is preferably not less than 10% by volume, more preferably not less than 15% by volume, and the content of the phosphazene derivative of the formula (V) is preferably not less than 20% by volume, more preferably not less than 30% by volume, and the total content of the isomer of the formula (VI) and the phosphazene derivative of the formula (VII) is preferably not less than 20% by volume, more preferably not less than 30% by volume. When the content is within the above numerical range, the safety of the electrolyte can be preferably improved.

From a viewpoint of "low-temperature characteristics" in the electrolyte, the content of the phosphazene derivative of the formula (III) is preferably not less than 1% by volume, more preferably not less than 3% by volume, further preferably not less than 5% by volume, and the total content of the isomer of the formula (VI) and the phosphazene derivative of the formula (VII) is not less than 1% by volume, more preferably not less than 2% by volume, further preferably not less than 5% by volume. When the content is less than 1% by volume, the low-temperature characteristics in the electrolyte are not sufficient.

From a viewpoint of "resistance to deterioration" in the electrolyte, the content of the phosphazene derivative of the formula (III) is preferably not less than 2% by volume, more preferably 3-75% by volume, and the content of the phosphazene derivative of the formula (IV) is preferably not less than 2% by volume, more preferably 2-75% by volume, and the content of the phosphazene derivative of the formula (V) is preferably not less than 2% by volume, more preferably 2-20% by volume, and the total content of the isomer of the formula (VI) and the phosphazene derivative of the formula (VII) is preferably not less than 2% by volume, more preferably 3-75% by volume. When the content is within the above numerical range, the deterioration of the electrolyte can be preferably controlled.

From a viewpoint of "decrease of viscosity" in the electrolyte, the content of the phosphazene derivative of the formula (III) is preferably not less than 3% by volume, more preferably 3-80% by volume. When the content is less than 3% by volume, the viscosity of the electrolyte can not be sufficiently decreased.

From a viewpoint of "control of viscosity rise" in the electrolyte, the content of the phosphazene derivative of the formula (V) is preferably not more than 40% by weight, more preferably not more than 35% by weight, further preferably not more than 30% by weight. When the content is more than 40% by weight, the viscosity rise of the electrolyte becomes remarkable large and the internal resistance becomes high and the electric conductivity becomes low.

From a viewpoint of "safety" in the primary battery, the electrolyte is particularly preferable to contain the cyclic phosphazene derivative of the formula (IV) or (V), or the isomer of the formula (VI) and the phosphazene derivative of the formula (VII), and $LiBF_4$ or $LiCF_3SO_3$, and γ-butyrolactone and/or propylene carbonate. In this case, even if the content is small, the safety is very high irrespectively of the previous description. That is, the content of the cyclic phosphazene derivative of the formula (IV) in the electrolyte is preferable to be not less than 5% by volume in order to develop the excellent safety. Also, the content of the cyclic phosphazene derivative of the formula (V) in the electrolyte is preferably 5-10% by weight, further preferably more than 10% by weight in order to develop the excellent safety in case of containing $LiBF_4$, and is preferably 5-25% by weight, further preferably more than 25% by weight in order to develop the excellent safety in case of containing $LiCF_3SO_3$. Furthermore, the total content of the isomer of the formula (VI) and the phosphazene derivative of the formula (VII) in the electrolyte is preferably 1.5-10% by volume, more preferably more than 10% by volume in order to develop the excellent safety in case of containing $LiBF_4$, and is preferably 2.5-15% by weight, more preferably more than 15% by weight in order to develop the excellent safety in case of containing $LiCF_3SO_3$. Moreover, if it is intended to use at a high temperature, it is also preferable to contain $Li(C_2F_5SO_2)_2N$, $Li(CF_3SO_2)_2N$ and $LiBF_4$ as the support salt.

On the other hand, from a view point of "safety" in the secondary battery, a case of containing $LiPF_6$ and ethylene carbonate and/or propylene carbonate, and a case of containing the cyclic phosphazene derivative of the formula (IV) or (V), or the isomer of the formula (VI) and the phosphazene derivative of the formula (VII), $LiCF_3SO_3$ and propylene carbonate are particularly preferable as an electrolyte. In these cases, even if the content is small, the safety is very high irrespectively of the previous description. That is, the content of the cyclic phosphazene derivative of the formula (IV) in the electrolyte is preferably not less than 5% by volume in order to develop the excellent safety. Also, the content of the cyclic phosphazene derivative of the formula (V) in the electrolyte is preferably 2-5% by weight, more preferably more than 5% by weight in order to develop the excellent safety. Furthermore, the total content of the isomer of the formula (VI) and the phosphazene derivative of the formula (VII) in the electrolyte is preferably 1.5-2.5% by volume, more preferably more than 2.5% by volume in order to develop the excellent safety.

Other Members

As the other member used in the non-aqueous electrolyte battery of the invention is mentioned a separator interposed between the positive and negative electrodes in the non-aqueous electrolyte battery and acting to prevent short-circuiting of current due to the contact between the electrodes. As a material of the separator are mentioned materials capable of surely preventing the contact between the electrodes and passing or impregnating the electrolyte such as non-woven fabrics, thin-layer films and the like made of synthetic resin such as polytetrafluoroethylene, polypropylene, polyethylene, cellulose based resin, polybutylene terephthalate, polyethylene terephthalate or the like. Among them, a microporous film having a thickness of about 20-50 μm and made of polypropylene or polyethylene, and a film made of cellulose based resin, polybutylene terephthalate, polyethylene terephthalate or the like are particularly preferable.

In the invention, various well-known members usually used in the battery can be favorably used in addition to the above separator.

Form of Non-Aqueous Electrolyte Battery

The form of the aforementioned non-aqueous electrolyte battery according to the invention is not particularly limited, and there are preferably mentioned various well-known forms such as coin type, button type, paper type, pentagon, cylindrical type of spiral structure and so on. In case of the button type, a non-aqueous electrolyte battery can be prepared by preparing sheet-shaped positive and negative electrodes, and sandwiching the separator between the positive and negative electrodes and the like. Also, in case of the spiral structure, a non-aqueous electrolyte battery can be prepared by preparing a sheet-shaped positive electrode, sandwiching between collectors, piling the negative electrode (sheet-shaped) thereon and then winding them or the like.

The invention will be described in detail with reference to the following examples, but the invention is not limited to these examples.

<Non-Aqueous Electrolyte Primary Battery>

EXAMPLE 1

A positive electrode for a lithium primary battery is prepared by the following method. Into 10 mL of ethanol is added 0.07 g (0.25 mmol) of titanium isopropoxide (Ti[OCH$(CH_3)_2]_4$) and stirred in air for 30 minutes for dissolving. Then, into the resulting ethanol solution is added and dispersed 1 g of manganese dioxide (EMD made by Mitsui Mining Co., Ltd.) with stirring. Thereafter, the dispersing solution is added with 0.5 mL (27 mmol) of water while cooling on ice to convert titanium isopropoxide into titanium hydroxide (Ti(OH)$_4$). Next, the resulting mixed solution containing titanium hydroxide is dried by heating at 80° C. and further dried at 300° C. for 1 hour to convert titanium hydroxide into titanium oxide, whereby there is obtained powder dispersing titanium oxide between particles of manganese dioxide. The thus obtained powder is charged into an oven of a glass tube and dehydrated at 100° C. for 1 hour to obtain powder for a positive electrode. In the powder for the positive electrode, a mass of titanium oxide is 2% per a mass of manganese dioxide.

The positive electrode for the lithium primary battery is prepared by mixing and milling the powder for the positive electrode, acetylene black and polytetrafluoroethylene (PTFE) at a ratio of 8:1:1 (mass ratio), shaping the milled mixture with a doctor blade into a sheet, drying in hot air (100-120° C.) and cutting out through a punching machine of φ 16 mm. Moreover, a mass of the positive electrode is 19 mg.

A lithium primary battery is prepared by using the positive electrode as follows. Moreover, a negative electrode is used by punching out a lithium foil (thickness 0.5 mm) at φ 16 mm, and a nickel foil is used as a collector. Also, an electrolyte is prepared by dissolving $LiBF_4$ in γ-butyrolactone (GBL) at a concentration of 0.75 mol/L. As a separator is used a cellulose separator (TF4030, made by Nippon Koudoshi Kogyo Co., Ltd.), through which are opposed the positive and negative electrodes and the electrolyte is poured and sealed to prepare CR2016 type lithium primary battery.

The battery characteristics of the lithium primary battery of this example are measured by the following test method and compared with those of the general-purpose lithium primary battery (Conventional Example 1). The general-purpose lithium primary battery of Conventional Example 1 has the same structure as in the lithium primary battery of Example 1 except that titanium oxide is not dispersed.

Each of these batteries is discharged to 1.5 V (limit voltage) at a constant current of 1 mA (0.2 C) in an atmosphere of 25° C. to obtain a discharge curve at room temperature shown in FIG. 1. In this figure, a solid line shown a discharge curve of Example 1, and dotted lines show a discharge curve of Conventional Example 1. As a discharge capacity is calculated from the discharge curve of FIG. 1, the discharge capacity of Example 1 is 277 mAh/g, and that of Conventional Example 1 is 235 mAh/g. Furthermore, as an energy density is calculated by integrating discharge time-voltage curve based on the discharge curve of FIG. 1, the energy density of Example 1 is 663 Wh/kg, and that of Conventional Example 1 is 583 Wh/kg.

EXAMPLES 2-3 AND COMPARATIVE EXAMPLES 1-2

A powder for a positive electrode is prepared in the same manner as in Example 1 except that an amount of titanium oxide dispersed between particles of manganese dioxide is changed as shown in Table 1, and then a lithium primary battery is prepared by using the same. With respect to the thus obtained lithium primary batteries, the discharge capacity and energy density are measured in the same manner as in Example 1 to obtain results shown in Table 1.

TABLE 1

|  | Unit | Example 1 | Example 2 | Example 3 | Comparative Example 1 | Comparative Example 2 |
| --- | --- | --- | --- | --- | --- | --- |
| Amount of titanium oxide | mass % | 2 | 0.5 | 4 | 0.3 | 5 |
| Discharge capacity | mAh/g | 277 | 275 | 276 | 243 | 249 |
| Energy density | Wh/kg | 663 | 659 | 660 | 601 | 622 |

As seem from these results, the discharge capacity and energy density are improved by dispersing titanium oxide between particles of manganese dioxide.

EXAMPLE 4

A CR2016 type lithium primary battery is prepared in the same manner as in Example 1 except that the electrolyte is prepared by dissolving $LiBF_4$ (lithium salt) at a concentration of 0.75 mol/L (M) into a mixed solution of 10% by volume of a phosphazene A (cyclic phosphazene derivative compound of the formula (IV) in which n is 3, two of six $R^5$s are ethoxy groups and the remaining four thereof are fluorine, viscosity at 25° C.: 1.2 mPa·s (1.2 cP)) and 90% by volume of γ-butyrolactone (GBL), and then the battery characteristics are measured to obtain a discharge curve at room temperature shown in FIG. 2. In this figure, a solid line shows the discharge curve of Example 4, and dotted lines show the discharge curve of Conventional Example 1. As a discharge capacity is calculated from the discharge curve of FIG. 2, the discharge capacity of Example 4 is 298 mAh/g, and that of Conventional Example 1 is 235 mAh/g. Furthermore, as an energy density is calculated by integrating discharge time-voltage curve based on the discharge curve of FIG. 2, the energy density of Example 4 is 726 Wh/kg, and that of Conventional Example 1 is 583 Wh/kg.

Also, the limit oxygen index of the electrolyte in Example 4 and Conventional Example 1 is measured according to JIS K7201. As a result, the limit oxygen index in the electrolyte of Example 4 is 25.1% by volume, and that in the electrolyte of Conventional Example 1 is 17.1% by volume.

EXAMPLES 5-6 AND COMPARATIVE EXAMPLES 3-4

A powder for a positive electrode is prepared in the same manner as in Example 1 except that an amount of titanium oxide dispersed between particles of manganese dioxide is changed as shown in Table 2, and then a lithium primary battery is prepared by using the same electrolyte as in Example 4. With respect to the thus obtained lithium primary batteries, the discharge capacity and energy density are measured in the same manner as in Example 1 to obtain results shown in Table 2.

TABLE 2

|  | Unit | Example 4 | Example 5 | Example 6 | Comparative Example 3 | Comparative Example 4 |
| --- | --- | --- | --- | --- | --- | --- |
| Amount of titanium oxide | mass % | 2 | 0.5 | 4 | 0.3 | 5 |
| Discharge capacity | mAh/g | 298 | 290 | 288 | 240 | 260 |
| Energy density | Wh/kg | 726 | 719 | 704 | 619 | 652 |

EXAMPLE 7

A lithium primary battery is prepared in the same manner as in Example 4 except that zinc oxide is dispersed between particles of manganese dioxide (mass of zinc oxide is 2% per mass of manganese dioxide) instead of titanium oxide, and the discharge capacity and energy density thereof are measured. As a result, the discharge capacity is 295 mAh/g and the energy density is 720 Wh/kg.

EXAMPLE 8

A lithium primary battery is prepared in the same manner as in Example 4 except that the electrolyte is prepared by using a phosphazene derivative B (cyclic phosphazene derivative compound of the formula (IV) in which n is 3 and one of six $R^5$s is methoxy group and the remaining five thereof are fluorine, viscosity at 25° C.: 1.8 mPa·s (1.8 cP)) instead of the phosphazene derivative A, and the discharge capacity and energy density thereof are measured. As a result, the discharge capacity is 297 mAh/g and the energy density is 725 Wh/kg. Also, the limit oxygen index of the electrolyte is 25.0% by volume as measured in the same manner as in Example 4.

EXAMPLE 9

A lithium primary battery is prepared in the same manner as in Example 4 except that the electrolyte is prepared by using a phosphazene derivative C (cyclic phosphazene derivative compound of the formula (IV) in which n is 4 and one of eight $R^5$s is ethoxy group and the remaining seven thereof are fluorine, viscosity at 25° C.: 1.3 mPa·s (1.3 cP)) instead of the phosphazene derivative A, and the discharge capacity and energy density thereof are measured. As a result, the discharge capacity is 295 mAh/g and the energy density is 720 Wh/kg. Also, the limit oxygen index of the electrolyte is 25.8% by volume as measured in the same manner as in Example 4.

As seen from these results, by dispersing titanium oxide between particles of manganese dioxide and by adding the phosphazene derivative to the electrolyte are considerably improved the discharge capacity and energy density and also the limit oxygen index of the electrolyte is raised to largely improve the safety.

<Non-Aqueous Electrolyte Secondary Battery>

EXAMPLE 10

A positive electrode for a non-aqueous electrolyte secondary battery is prepared by the following method. Into 10 mL of ethanol is added 0.07 g (0.25 mmol) of titanium isopropoxide ($Ti[OCH(CH_3)_2]_4$) (made by Aldorich) and stirred in air for 30 minutes for dissolution. Then, 1 g of $LiCoO_2$ (made by Nippon Kagaku Kogyo Co., Ltd.) is added and dispersed into the resulting ethanol solution with stirring. Thereafter, the dispersing solution is added with 0.5 mL (27 mmol) of water while cooling on ice to convert titanium isopropoxide into titanium hydroxide ($Ti(OH)_4$). Next, the resulting mixed solution containing titanium hydroxide is dried by heating at 80° C. and further dried at 300° C. for 1 hour to convert titanium hydroxide into titanium oxide, whereby there is obtained powder dispersing titanium oxide between particles of $LiCoO_2$. The thus obtained powder is charged into an oven of a glass tube and dehydrated at 100° C. for 1 hour to obtain a powder for a positive electrode. In the powder for the positive electrode, a mass of titanium oxide is 2% per a mass of $LiCoO_2$.

To 100 parts by mass of the above powder for the positive electrode are added 10 parts by mass of acetylene black and 10 parts by mass of polytetrafluoroethylene (PTFE) and milled with an organic solvent (mixed solvent of 50/50% by volume of ethyl acetate and ethanol), which is subjected to rolling through rolls to prepare a thin-layer positive electrode sheet having a thickness of 100 μm and a width of 40 mm. Thereafter, an aluminum foil (collector) coated on its surface with an electrically conductive adhesive and having a thickness of 25 μm is sandwiched between the thus obtained two positive electrode sheets, and then a lithium metal foil having a thickness of 150 μm is piled thereon through a separator having a thickness of 25 μm (microporous film: made of polypropylene), which are rolled up to obtain cylinder type electrodes. In this cylinder type electrodes, a length of the positive electrode is about 260 mm.

An electrolyte is prepared by dissolving $LiBF_4$ (support salt) at a concentration of 0.75 mol/kg in a mixed solution of 50% by volume of diethyl carbonate and 50% by volume of ethylene carbonate. This electrolyte is poured into the cylinder type electrodes and sealed to prepare an AA lithium battery.

This battery is repeatedly subjected to recharging-discharging of 50 cycles in air at 25° C. under conditions that an upper limit voltage is 4.5 V, a lower limit voltage is 3.0 V, a discharge current is 100 mA and a recharge current is 50 mA. As a result, an initial discharge-recharge capacity is 145 mAh/g, and a discharge-recharge capacity after 50 cycles is 142 mAh/g.

Also, the limit oxygen index of the above electrolyte is 17.1% by volume as measured according to JIS K7201.

CONVENTIONAL EXAMPLE 2

An AA lithium battery is prepared in the same manner as in Example 10 except that a thin-layer positive electrode sheet having a thickness of 100 μm and a width of 40 mm is prepared by adding 10 parts by mass of acetylene black and 10 parts by mass of polytetrafluoroethylene (PTFE) to 100 parts by mass of $LiCoO_2$ and milling with an organic solvent (mixed solvent of 50/50% by volume of ethyl acetate and ethanol) and subjecting to rolling through rolls, and then the discharge-recharge capacity is measured. As a result, the initial discharge-recharge capacity is 141 mAh/g and the discharge-recharge capacity after 50 cycles is 130 mAh/g.

EXAMPLES 11-12 AND COMPARATIVE EXAMPLES 5-6

A powder for the positive electrode is prepared in the same manner as in Example 10 except that an amount of titanium oxide to be dispersed between particles of $LiCoO_2$ is changed as shown in Table 3, and a lithium secondary battery is prepared by using the same. With respect to the thus obtained battery, the discharge-recharge capacity is measured in the same manner as in Example 10. The results are shown in Table 3.

TABLE 3

| | Unit | Example 10 | Example 11 | Example 12 | Comparative Example 5 | Comparative Example 6 |
|---|---|---|---|---|---|---|
| Amount of titanium oxide | mass % | 2 | 0.5 | 4 | 0.3 | 5 |
| Initial discharge-recharge capacity | mAh/g | 145 | 145 | 145 | 140 | 142 |
| Discharge-recharge capacity after 50 cycles | mAh/g | 142 | 142 | 142 | 129 | 133 |

EXAMPLES 13-14

A powder for the positive electrode is prepared in the same manner as in Example 10 except that a metal oxide shown in Table 4 is dispersed between particles of $LiCoO_2$ instead of titanium oxide, and a lithium secondary battery is prepared by using the same. With respect to the thus obtained battery, the discharge-recharge capacity is measured in the same manner as in Example 10. The results are shown in Table 4.

TABLE 4

|  | Example 10 | Example 13 | Example 14 |
|---|---|---|---|
| Kind of metal oxide | $TiO_2$ | ZnO | $Al_2O_3$ |
| Initial discharge-recharge capacity (mAh/g) | 145 | 145 | 144 |
| Discharge-recharge capacity after 50 cycles (mAh/g) | 142 | 141 | 140 |

EXAMPLE 15

An AA lithium battery is prepared in the same manner as in Example 10 except that an electrolyte is prepared by dissolving $LiBF_4$ (support salt) at a concentration of 0.75 mol/kg in a mixed solution of a phosphazene derivative A (cyclic phosphazene derivative compound of the formula (IV) in which n is 3 and two of six $R^5$s are ethoxy group and the remaining four thereof are fluorine, viscosity at 25° C.: 1.2 mPa·s (1.2 cP)), 45% by volume of diethyl carbonate and 45% by volume of ethylene carbonate, and the discharge-recharge capacity is measured. As a result, the initial discharge-recharge capacity is 145 mAh/g, and the discharge-recharge capacity after 50 cycles is 144 mAh/g. Also, the limit oxygen index of the above electrolyte is 22.7% by volume as measured in the same manner as in Example 10.

EXAMPLE 16

An electrolyte is prepared in the same manner as in Example 15 except that a phosphazene derivative D (cyclic phosphazene derivative compound of the formula (IV) in which n is 3 and one of six $R^5$s is ethoxy group and the remaining five thereof are fluorine, viscosity at 25° C.: 1.2 mPa·s (1.2 cP)) is used instead of the phosphazene derivative A, whereby a non-aqueous electrolyte secondary battery is prepared and the discharge-recharge capacity and the limit oxygen index are measured. The results are shown in Table 5.

EXAMPLE 17

An electrolyte is prepared in the same manner as in Example 15 except that a phosphazene derivative C (cyclic phosphazene derivative compound of the formula (IV) in which n is 4 and one of eight $R^5$s is ethoxy group and the remaining seven thereof are fluorine, viscosity at 25° C.: 1.3 mPa·s (1.3 cP)) is used instead of the phosphazene derivative A, whereby a non-aqueous electrolyte secondary battery is prepared and the discharge-recharge capacity and the limit oxygen index are measured. The results are shown in Table 5.

EXAMPLE 18

An electrolyte is prepared in the same manner as in Example 15 except that a phosphazene derivative E (cyclic phosphazene derivative compound of the formula (IV) in which n is 3 and one of six $R^5$s is $OCH_2CF_3$ and the remaining five thereof are fluorine, viscosity at 25° C.: 1.8 mPa·s (1.8 cP)) is used instead of the phosphazene derivative A, whereby a non-aqueous electrolyte secondary battery is prepared and the discharge-recharge capacity and the limit oxygen index are measured. The results are shown in Table 5.

TABLE 5

|  | Example 10 | Example 15 | Example 16 | Example 17 | Example 18 |
|---|---|---|---|---|---|
| Kind of phosphazene | — | phosphazene A | phosphazene D | phosphazene C | phosphazene E |
| Initial discharge-recharge capacity (mAh/g) | 145 | 145 | 146 | 146 | 145 |
| Discharge-recharge capacity after 50 cycles (mAh/g) | 142 | 144 | 145 | 145 | 144 |
| Limit oxygen index (volume %) | 17.1 | 22.7 | 23.5 | 24.1 | 23.9 |

As seen from these results, the discharge-recharge capacity and the cycling characteristics are improved by dispersing the metal oxide between particles of lithium-containing composite oxide. Also, the electrolyte is prepared by adding the phosphazene derivative in addition to the dispersion of the metal oxide between particles of the lithium-containing composite oxide, whereby the discharge-recharge capacity and the cycling characteristics are further improved and the limit oxygen index of the electrolyte is raised and the safety of the battery is improved.

INDUSTRIAL APPLICABILITY

According to the invention, a positive electrode suitable for a non-aqueous electrolyte primary battery can be provided by using powder dispersing a particular metal oxide between particles of manganese dioxide, and also a non-aqueous electrolyte primary battery having high discharge capacity and energy density and a high output power and a long life can be provided by using such a positive electrode. Further, the non-aqueous electrolyte primary battery is constituted by using the positive electrode made of powder dispersing the particular metal oxide between particles of manganese dioxide and an electrolyte added with a phosphazene derivative and/or an isomer of the phosphazene derivative, whereby there can be provided a non-aqueous electrolyte primary battery having high discharge capacity and energy density and a high output power and a long life and a high safety.

And also, according to the invention, a non-aqueous electrolyte secondary battery having a high discharge-recharge capacity can be provided by constituting the non-aqueous electrolyte secondary battery with a positive electrode made of a powder dispersing a particular metal oxide between particles of lithium-containing composite oxide. Furthermore, a non-aqueous electrolyte secondary battery having a considerably high discharge-recharge capacity and a high safety can be provided by constituting the non-aqueous electrolyte secondary battery with the positive electrode made of the powder dispersing the particular metal oxide between particles of the lithium-containing composite oxide and an electrolyte added with a phosphazene derivative and/or an isomer of the phosphazene derivative.

The invention claimed is:

1. A method of producing a positive electrode for a non-aqueous electrolyte secondary battery, which comprises the steps of:
   (I) a step of producing a mixed solution by adding at least one lithium-containing composite oxide selected from the group consisting of $LiCoO_2$, $LiNiO_2$ and $LiMn_2O_4$ and an alkoxide of at least one metal selected from the group consisting of titanium, aluminum, zinc, chromium, lithium, nickel, copper and iron to an organic solvent and mixing them;
   (II) a step of adding water to the mixed solution to produce a metal hydroxide;
   (III) a step of changing the resulting metal hydroxide into a metal oxide by heating and drying a solution containing the metal hydroxide and dispersing the metal oxide between particles of the lithium-containing composite oxide to produce powder for a positive electrode; and
   (IV) a step of shaping the powder for a positive electrode to produce a positive electrode.

2. A method of producing a positive electrode for a non-aqueous electrolyte secondary battery according to claim 1, wherein the metal is titanium.

3. A method of producing a positive electrode for a non-aqueous electrolyte secondary battery according to claim 1, wherein the alkoxide of the metal is titanium isopropoxide (Ti$[OCH(CH_3)_2]_4$).

* * * * *